US009065990B2

(12) United States Patent
Matsumoto et al.

(10) Patent No.: US 9,065,990 B2
(45) Date of Patent: Jun. 23, 2015

(54) MICROPHONE ASSEMBLY

(71) Applicant: TEAC Corporation, Tokyo (JP)

(72) Inventors: Atsushi Matsumoto, Saitama (JP); Norio Matsuura, Tokyo (JP)

(73) Assignee: TEAC Corporation, Tama-shi, Tokyo (JP)

(*) Notice: Subject to any disclaimer, the term of this patent is extended or adjusted under 35 U.S.C. 154(b) by 0 days.

(21) Appl. No.: 14/189,795

(22) Filed: Feb. 25, 2014

(65) Prior Publication Data

US 2015/0062425 A1     Mar. 5, 2015

(30) Foreign Application Priority Data

Sep. 3, 2013  (JP) ................. 2013-181960

(51) Int. Cl.
*H04N 5/225* (2006.01)
*G03B 17/56* (2006.01)
*H04R 1/02* (2006.01)
*H04R 1/08* (2006.01)

(52) U.S. Cl.
CPC ............ *H04N 5/2252* (2013.01); *G03B 17/566* (2013.01); *H04R 1/028* (2013.01); *H04R 1/083* (2013.01); *H04R 2499/11* (2013.01)

(58) Field of Classification Search
CPC .. G03B 2217/00; G03B 17/56; G03B 17/561; G03B 17/566; G03B 17/568; H04N 5/225; H04N 5/2251; H04N 5/2252
See application file for complete search history.

(56) References Cited

U.S. PATENT DOCUMENTS

| 7,864,243    | B2 * | 1/2011  | Tsutsumi ................ 348/373 |
| 2008/0273108 | A1 * | 11/2008 | Tsutsumi ................ 348/333.01 |
| 2013/0100591 | A1 * | 4/2013  | Montevirgen et al. ... 361/679.01 |
| 2015/0062418 | A1 * | 3/2015  | Matsumoto et al. ........ 348/373 |

FOREIGN PATENT DOCUMENTS

JP        2530604 Y2    12/1996

* cited by examiner

*Primary Examiner* — Nicholas Giles
(74) *Attorney, Agent, or Firm* — Seed IP Law Group PLLC

(57) ABSTRACT

A microphone assembly includes a microphone unit and an attachment unit. The attachment unit includes a camera shoe attachment section to be attached to a camera shoe and a damper housing cylinder fixed to the camera shoe attachment section. A holder is fixed to a lower end of an inner cylinder of a protruding section protruding from the microphone unit. The lower end of the inner cylinder is pivotally supported by a second damper contained in the damper housing cylinder through the holder. The middle portion of the protruding section is supported by a first damper contained in the damper housing cylinder.

4 Claims, 7 Drawing Sheets

MICROPHONE ASSEMBLY

BACKGROUND

1. Technical Field

The present invention relates to a microphone assembly detachably attached to a digital camera.

2. Description of the Related Art

Recently, a digital camera capable of capturing not only a still image but also a moving image for a longer period of time has been widely spread. The digital camera includes a camera body and a lens device fixed to or detachably attached to a front side of the camera body. The camera body is provided with an imaging device including an image sensor, an image processing device, an image recording device, and the like.

In high-grade cameras such as a single-lens reflex camera and a mirror-less camera, a detachable zoom lens is used as the lens device in many cases. The zoom lens is configured such that a focus lens is caused to move in an optical axis direction at the time of focusing and a magnification lens is caused to move in the optical axis direction at the time of zooming. Additionally, in many cases, the zoom lens has a shake correction device. In the shake correction device, in accordance with movement of a camera, a correction lens or an image sensor is caused to move in a direction opposite to a direction in which the camera moves, so as to prevent occurrence of image blur. A separate motor is used for each of the zooming operation, the focusing operation, and the shake correction. These motors are contained in the camera body or the lens device.

In the digital camera capable of capturing a moving image, a plurality of small sound collection holes are formed on the camera body. A built-in piezoelectric microphone having a simple structure, for example, is disposed behind the sound collection holes. Upon receiving instructions for recording sound, the built-in microphone converts the sound into a sound signal, and the sound signal is recorded together with image data of the moving image on a recording medium such as a memory card.

Since the motor for focusing, the motor for zooming, and the motor for image correction are driven during capturing of the moving image, the operating noise generated in the camera body is picked up by the built-in microphone. Additionally, since minute vibration due to the operation of the zoom motor and the like is transmitted to the built-in microphone, vibrating sound of the built-in microphone is also generated. As a result, continuous rasping noise is also recorded, and therefore it becomes impossible to perform recording with high-quality sound.

In order to prevent degradation in sound quality caused by operation of the lens device, a microphone assembly which is disposed outside the camera body and has a vibration isolation structure has been proposed. For example, according to Japanese Utility Model Registration No. 2530604, a microphone assembly includes a microphone unit having microphones contained in a metal casing and a base plate fixed to a rear end thereof, and an accordion elastic member disposed outside the microphone unit. The elastic member is inserted into an opening formed on the camera body of a digital camera (camera-integrated videotape recorder), and attached to a fixed wall of the camera body through a ring. The accordion elastic member functions so as not to transmit the operating noise of the lens device to the microphone unit.

According to Japanese Utility Model Registration No. 2530604, it is necessary to support the microphone unit at two points or support the microphone unit in a range having a certain degree of length by the accordion elastic member for the purpose of decreasing the vibration of the microphone unit. Accordingly, there arises a problem that the size of the microphone assembly is increased. As a countermeasure against this problem, it may be possible to provide an attachment shaft protruding downward from the casing of the microphone unit and support an outer circumference of the attachment shaft by a damper. In this case, although the vibration of the microphone unit in a planar direction can be absorbed by the damper, the vibration of the microphone unit in a vertical direction cannot be absorbed sufficiently by the damper. Further, according to Japanese Utility Model Registration No. 2530604, the microphone assembly is not detachable from the camera body, and therefore the microphone assembly disturbs a user when a moving image with sound is not captured.

BRIEF SUMMARY

In view of the above, an object of the present invention is to provide a microphone assembly detachably attached to a camera body and having a small mechanism for preventing transmission of vibration.

In order to achieve the above and other objects, a microphone assembly of the present invention includes a microphone unit, a camera shoe attachment section, a damper housing cylinder, a holder having the shape of a bowl, a first damper, and a second damper. The microphone unit has at least one microphone, a casing to which the microphone is attached, a protruding section which protrudes downward from the casing, and a projection which projects downward from a circumference of the protruding section. The camera shoe attachment section is detachably attached to a camera shoe formed on a body of a digital camera. The damper housing cylinder is attached to the camera shoe attachment section. The holder is attached to a lower portion of the protruding section. The first damper, into which the protruding section is inserted, is attached to an inside of the damper housing cylinder. The first damper is clamped between the projection and the holder, so as to support a middle portion of the protruding section. The second damper pivotally supports a lower portion of the holder in the damper housing cylinder.

The first damper preferably includes an inner ring into which the protruding section is inserted, an outer ring disposed outside the inner ring, a plurality of ribs for connecting the inner ring and the outer ring, and a positioning convex portion formed on an inner circumferential surface of the inner ring so as to prevent the protruding section from being rotated.

Further, the second damper preferably includes a cylindrical portion which is fit into the holder, a ring which is fit into an inside of the camera shoe attachment section, and a damper body having the shape of a dish, for connecting the cylindrical portion and the ring.

Preferably, the protruding section is a cylinder having a screw hole formed on a lower portion thereof, and a screw is threaded into the screw hole so as to fix the holder to the lower portion of the protruding section.

According to the present invention, the first damper clamped between the holder attached to the protruding section which protrudes downward from the casing of the microphone unit and the projection which projects downward from the circumference of the protruding section is used to prevent the horizontal vibration of the digital camera from being transmitted to the microphone unit. Further, the second damper is used to pivotally support the lower portion of the holder so as to prevent the vertical vibration of the digital camera from being transmitted to the microphone unit. Therefore, it is possible to prevent transmission of vibration with the use of a small mechanism, and perform recording with high-quality sound.

Further, since the microphone assembly of the present invention is detachably attached to the camera shoe, the microphone assembly can be removed while the moving image with sound is not captured. Therefore, the present invention is convenient in view of portability and keeping.

BRIEF DESCRIPTION OF THE SEVERAL VIEWS OF THE DRAWINGS

The above objects and advantages of the present invention will become easily understood by one of ordinary skill in the art when the following detailed description of the preferred embodiments would be read in connection with the accompanying drawings, wherein.

DETAILED DESCRIPTION

Figure 1:
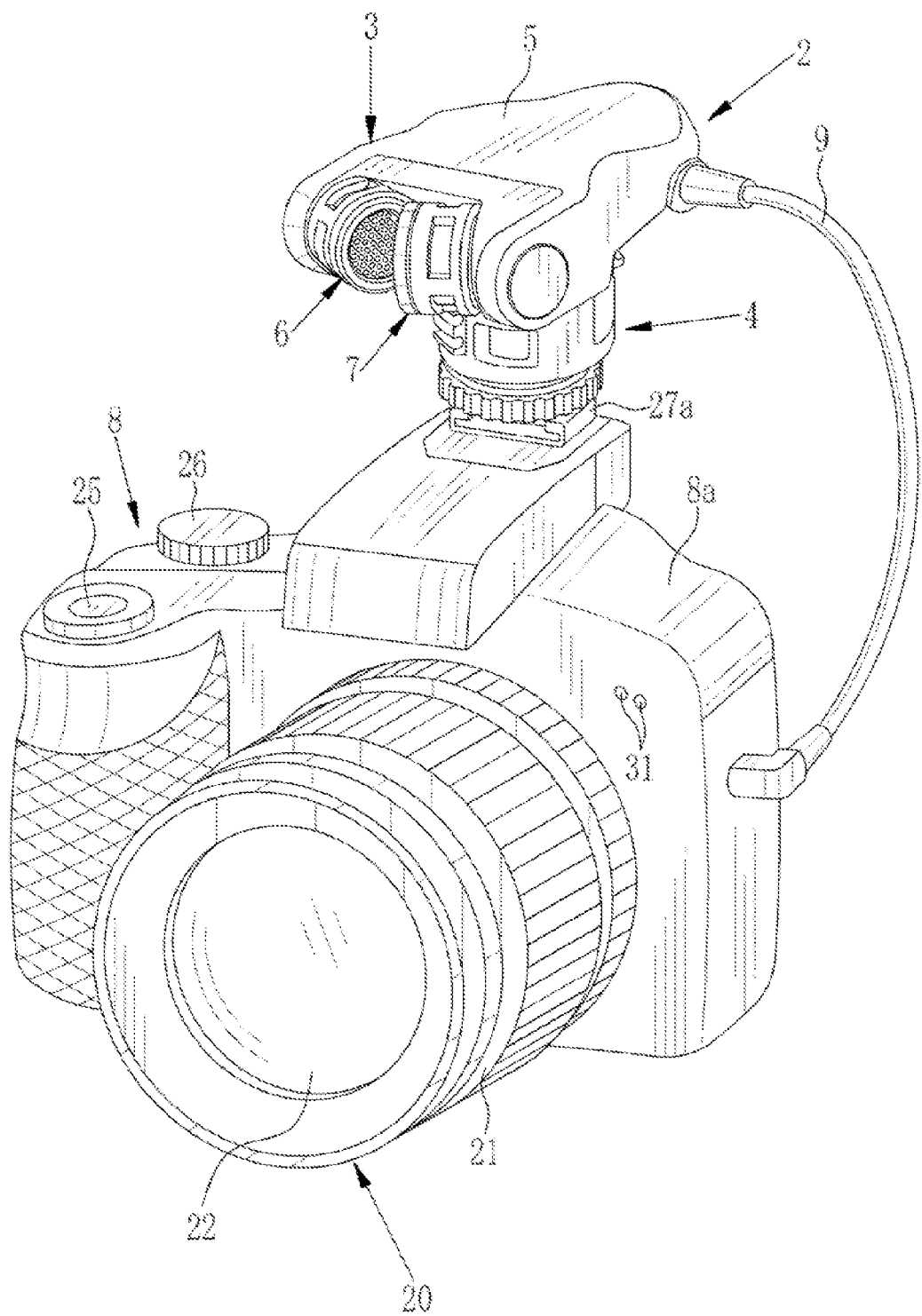
FIG. 1 is a perspective view of a microphone assembly attached to a digital camera according to an embodiment of the present invention.
Figure 2:
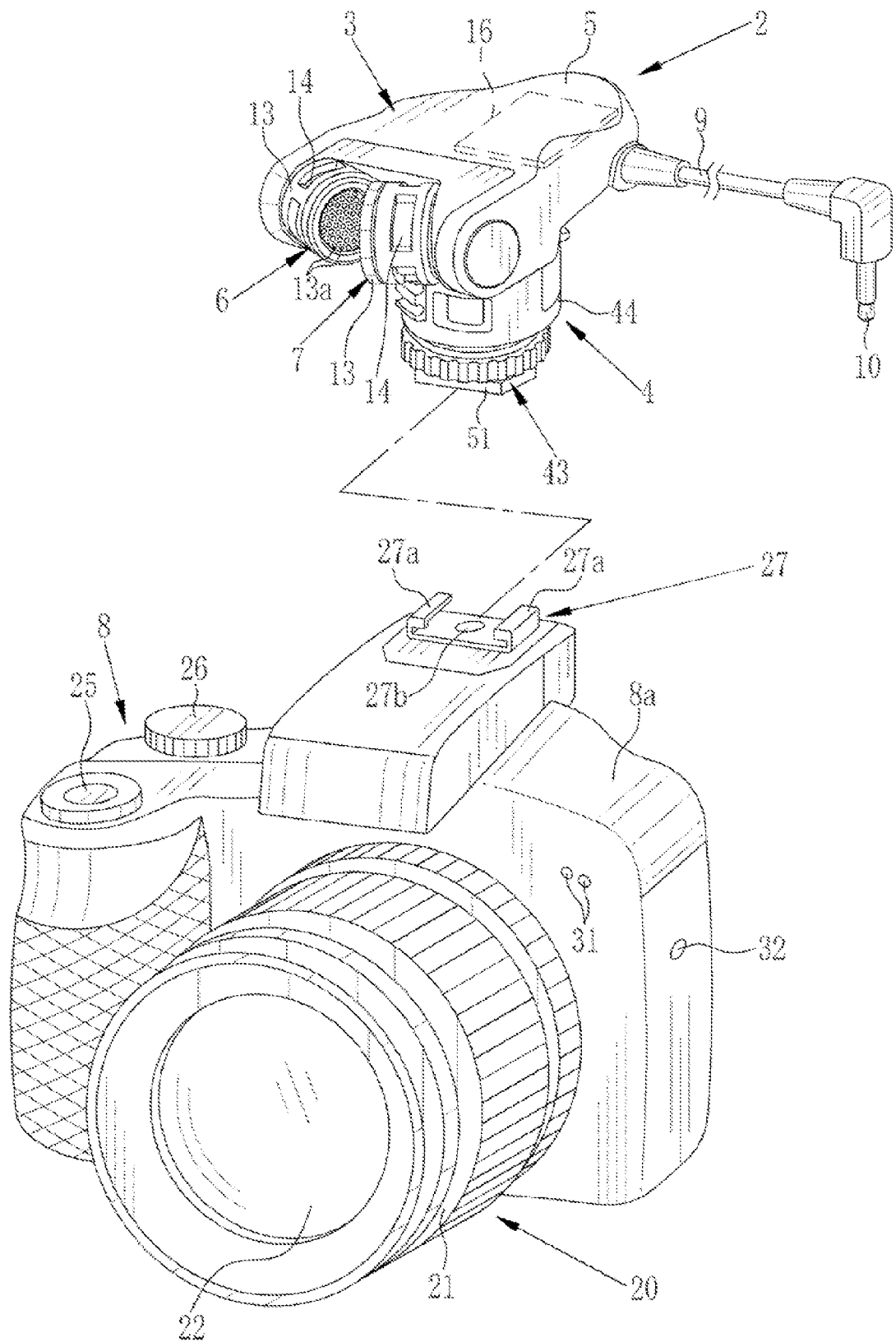
FIG. 2 is a perspective view of the microphone assembly detached from the digital camera.
Figure 3:
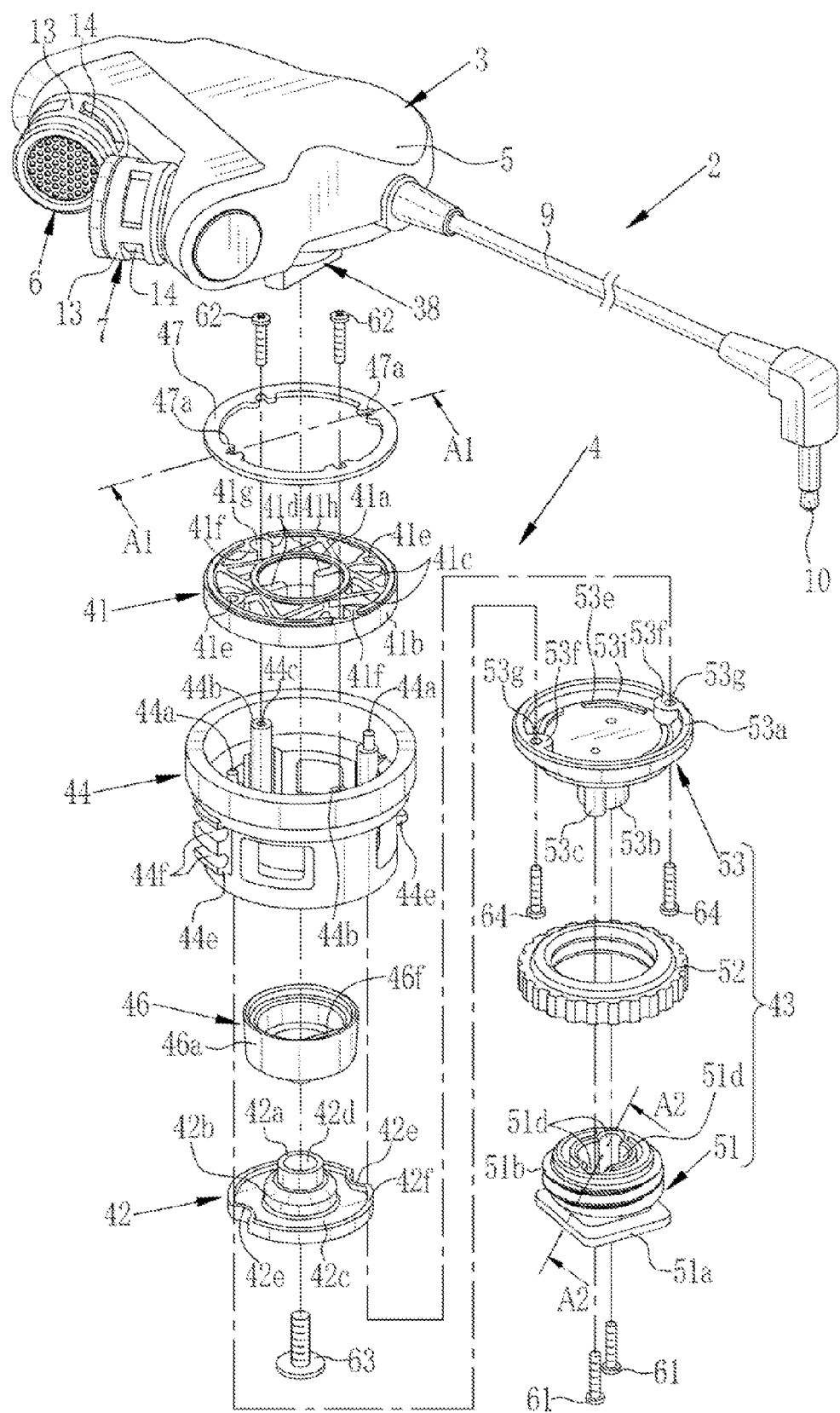
FIG. 3 is an exploded perspective view of the microphone assembly.
Figure 4:
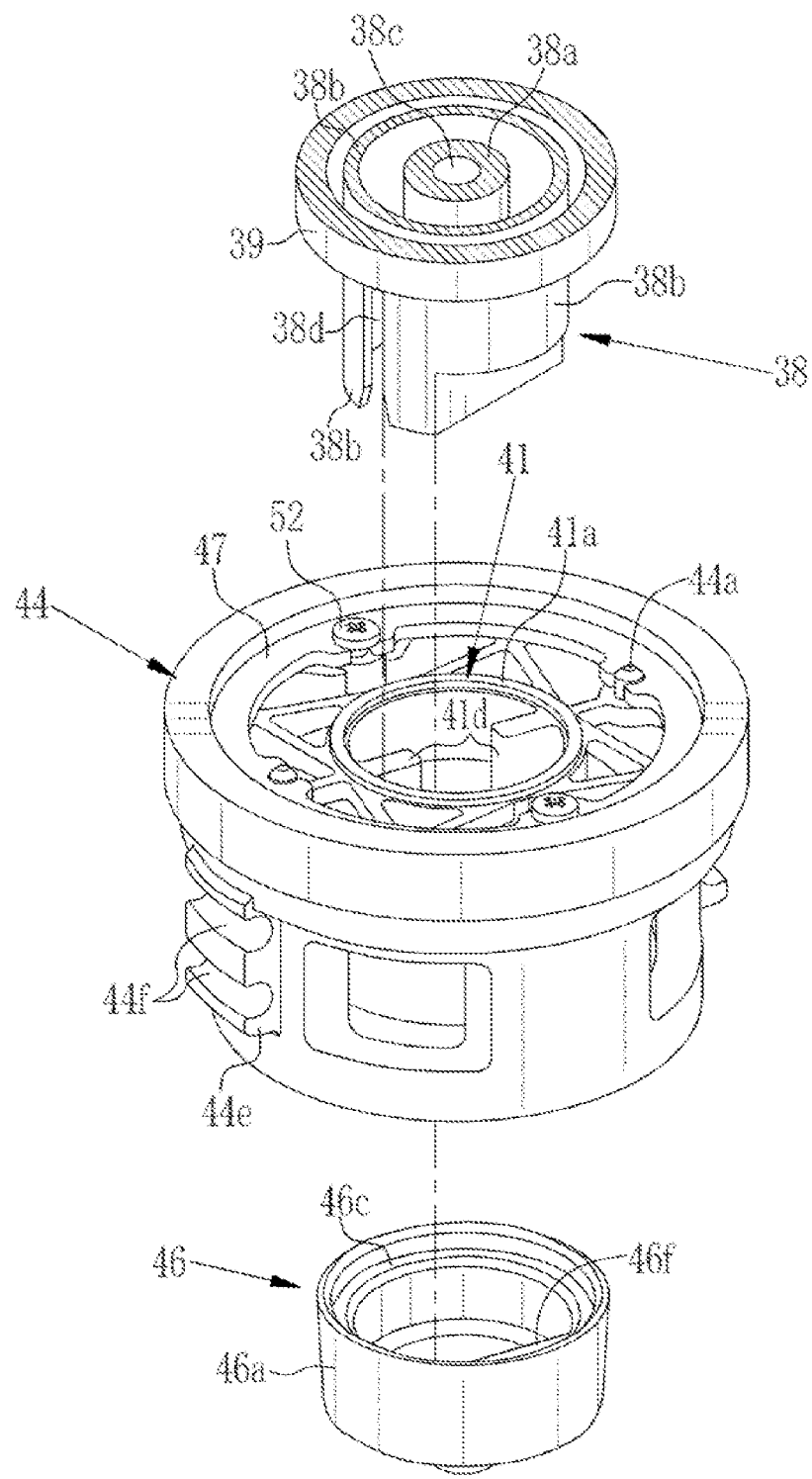
FIG. 4 is a perspective view illustrating a protruding section of the microphone unit and a damper housing cylinder.

As shown in FIGS. 1 and 2, a microphone assembly 2 consists of a microphone unit 3 and an attachment unit 4. The microphone unit 3 includes a casing 5, and a left microphone 6 and a right microphone 7 respectively attached to the casing 5. The microphone assembly 2 is detachably attached to a digital camera 8 through a camera shoe 27. The casing 5 is provided with a connection cord 9 for transmitting a sound signal from the microphones 6 and 7 to the digital camera 8. A pin jack 10 is fixed to a tip of the connection cord 9. Although a single-lens reflex camera is described in this embodiment, a compact camera may be used. Further, it may be sufficient to use one microphone.

Figure 6:
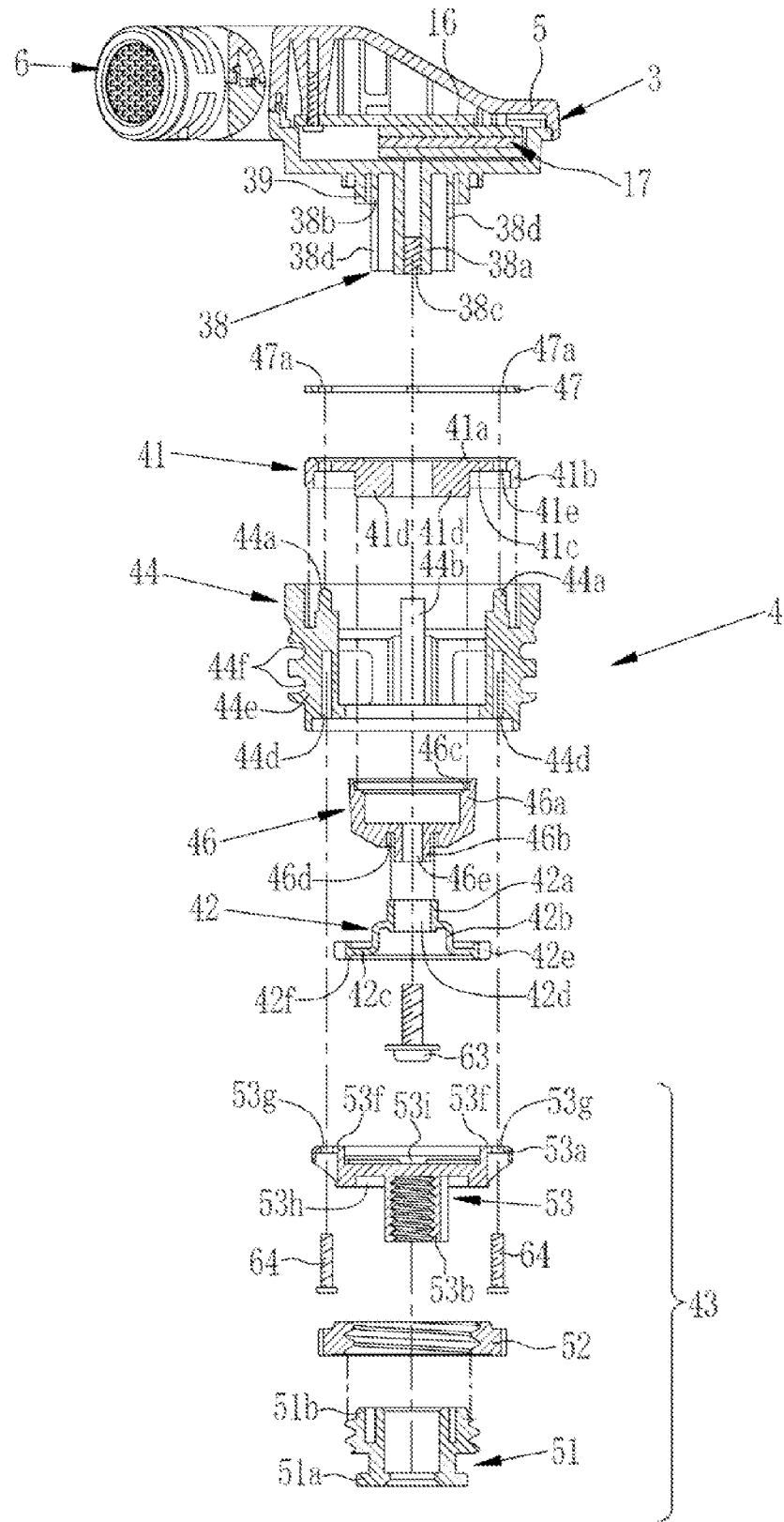
FIG. 6 is a cross-sectional view of the exploded microphone assembly taken along lines A1-A1 of FIG. 3.

Each of the left and right microphones 6 and 7 consists of a cylindrical transducer chamber 13 containing a transducer 14 for converting sound into a sound signal (electrical signal). The transducer chamber 13 has plural sound collection holes 13a for transmitting ambient sound to the transducer 14. A control board 16 for controlling driving of the microphone unit 3 is disposed in the casing 5. The transducer 14 of each of the left and right microphones 6 and 7 and the connection cord 9 are connected to the control board 16. A plate weight 17 (see FIG. 6) is disposed under the control board 16. The weight 17 achieves a weight balance between the front section and the rear section of the microphone unit 3 while the front section includes the left and right microphones 6 and 7. Further, the weight 17 makes a frequency of a resonance point low.

The digital camera 8 includes a camera body 8a and a lens device 20 detachably attached to a front side of the camera body 8a. As is well known, the camera body 8a includes an imaging device containing an image sensor, an image processing device, an image/sound recording device, and the like. The lens device 20 includes a lens barrel 21 and a zoom lens system 22 disposed in the lens barrel 21. A zoom motor for zooming operation, a focus motor for focusing operation, and a shake correction motor for shake correction are housed in the lens barrel 21. Note that some of these motors may be disposed in the camera body 8a.

A release button 25, a mode setting dial 26, the camera shoe 27, and the like are arranged on an upper side of the camera body 8a. The mode setting dial 26 is used to select one of a still image capturing mode, a moving image capturing mode, a moving image/sound capturing mode, a reproducing mode for reproducing the image and the sound stored in a detachable memory card, and the like. The camera shoe 27 has a pair of bent sections 27a for holding a leg portion 51 of the microphone assembly 2, and a contact point 27b for transmitting a flash trigger signal while a flash device (not shown) is attached to the camera shoe 27.

A plurality of sound collection holes 31 are formed on the front side of the camera body 8a. A simple built-in microphone is disposed behind the sound collection holes 31. The built-in microphone is used to record the sound at the time of capturing a moving image, or is used to record only the sound. However, the built-in microphone picks up operating noise of the zoom motor and the like, and noise caused by vibration of the built-in microphone upon receiving vibration from the zoom motor and the like, and therefore it becomes impossible to perform recording with high-quality sound.

A connector 32 is provided to a lateral side of the camera body 8a. The pin jack 10 of the connection cord 9 is inserted into the connector 32. The sound signal from the microphone assembly 2 is transmitted through the connection cord 9 to the image/sound recording device in the camera body 8a. Note that an external recording device may be connected to the connector 32 such that the pin jack 10 is inserted into an input terminal of the external recording device and thus connected to the connector 32. In this case, the sound signal from the microphone assembly 2 is transmitted through the connection cord 9 to the external recording device. Further, it is of course possible to transmit the sound signal from the microphone assembly 2 through the external recording device to the image/sound recording device in the camera body 8a.

As shown in FIGS. 3 to 6 illustrating the microphone assembly 2, the casing 5 is provided with a protruding section 38. The protruding section 38 protrudes from a lower surface of the casing 5. The protruding section 38 consists of an inner cylinder 38a and an outer cylinder 38b disposed outside the inner cylinder 38a. A screw hole 38c is formed on a lower end of the inner cylinder 38a. The outer cylinder 38b has two slits 38d arranged at a pitch of 180°. The outer cylinder 38b is partially cut off to have a D-cut shape. Further, the casing 5 is provided with a projection 39. The projection 39 protrudes downward from a circumference of the protruding section 38, and is shorter than the protruding section 38.

The microphone unit 3 is attached to the camera shoe 27 through the attachment unit 4. The attachment unit 4 includes a first damper 41 and a second damper 42 as elastic members made of rubber, for example, a camera shoe attachment section 43 detachably attached to the camera shoe 27, and a damper housing cylinder 44 made of resin and attached to the camera shoe attachment section 43. The damper housing cylinder 44 contains the first and second dampers 41 and 42. The attachment unit 4 further includes a holder 46 made of resin and disposed in the damper housing cylinder 44, and a press ring 47 to be placed on the first damper 41.

The first damper 41 supports a middle portion of the protruding section 38, and the second damper 42 pivotally supports the lower end of the inner cylinder 38a through the holder 46. Accordingly, the first and second dampers 41 and 42 support the protruding section 38 at two points, and thus three-dimensional vibration of the camera body 8a is prevented from being transmitted to the microphone unit 3. Thereby, the vibration of the pair of microphones 6 and 7 is prevented, and as a result, generation of noise due to the vibration thereof is prevented.

The camera shoe attachment section 43 consists of the leg portion 51 mounted to the camera shoe 27, a clamp ring 52 for clamping the camera shoe 27 between the clamp ring 52 and the leg portion 51, and an attachment base 53 attached to the leg portion 51 and the damper housing cylinder 44.

Figure 7:
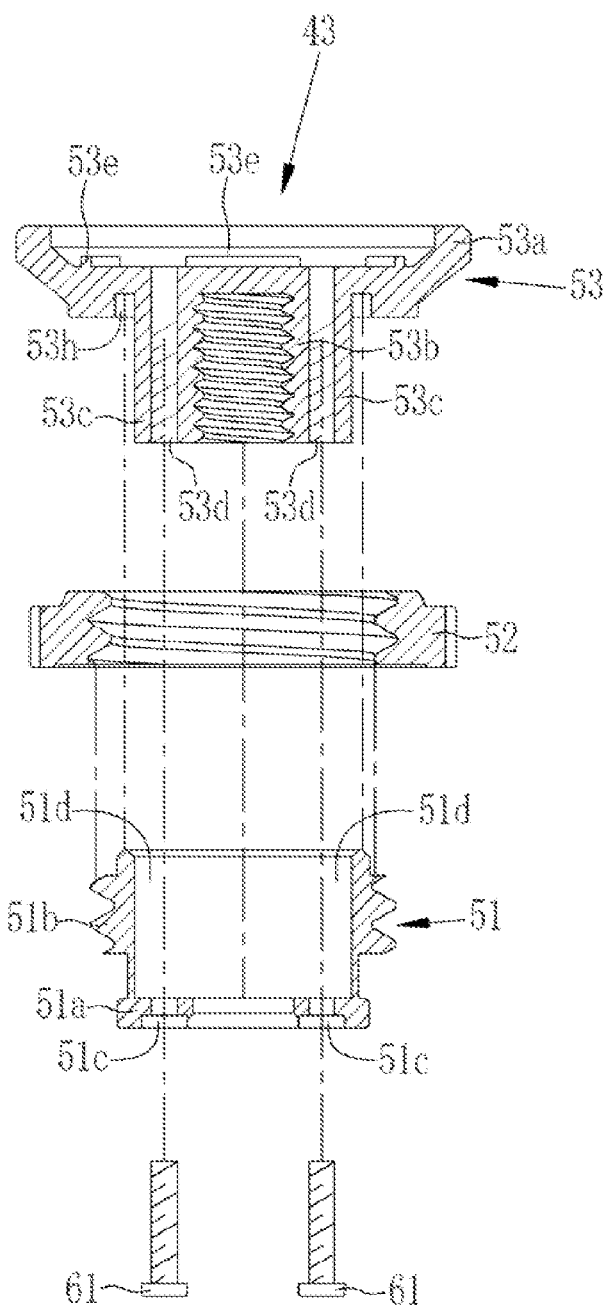
FIG. 7 is a cross-sectional view of an exploded camera shoe attachment section taken along lines A2-A2 of FIG. 3.

The leg portion 51 consists of a plate portion 51a to be inserted into the bent sections 27a of the camera shoe 27, and a cylindrical portion 51b having a male thread formed on the upper outer circumference thereof. Two screw insertion holes 51c are formed in the plate portion 51a at a pitch of 180° (see FIG. 7). Two insertion holes 51d communicated with the screw insertion holes 51c on a one-by-one-basis are formed in the cylindrical portion 51b.

A female screw into which the male screw of the cylindrical portion 51b is threaded is formed on an inner circumferential surface of the clamp ring 52. Additionally, knurling is applied on the whole outer circumferential surface of the clamp ring 52, so as to be caught by a finger of a user at the time of rotating the clamp ring 52.

The attachment base 53 consists of a base body 53a, a cylindrical section 53b protruding downward from the center of the base body 53a so as to be inserted into the cylindrical portion 51b, and two attachment bosses 53c formed on an outer circumference of the cylindrical section 53b so as to be inserted into the insertion holes 51d on a one-by-one basis. Each of the two attachment bosses 53c has a screw hole 53d (see FIG. 7).

The base body 53a includes a positioning rib 53e for positioning the second damper 42 in the radial direction, and two bosses 53f formed at a pitch of 180°. Each of the bosses 53f has a screw insertion hole 53g. A recess portion 53h into which the front end of the cylindrical portion 51b is inserted is formed on the lower surface of the base body 53a. The cylindrical section 53b is inserted into the cylindrical portion 51b, and each of the attachment bosses 53c is inserted into the corresponding insertion hole 51d. In this state, a screw 61 is screwed to the screw hole 53d of each of the attachment bosses 53c through the corresponding screw insertion hole 51c of the plate portion 51a (see FIG. 7), and thus the leg portion 51 is fixed to the attachment base 53.

The first damper 41 includes an inner ring 41a and an outer ring 41b disposed outside the inner ring 41a. The rings 41a and 41b are connected with each other via a plurality of ribs 41c.

The inner circumferential surface of the inner ring 41a includes two convex portions 41d which are inserted into the slits 38d of the protruding section 38 on a one-by-one basis so as to prevent the protruding section 38 from being rotated. An outer circumferential end portion of the rib 41c, which is located at the same position as each of the convex portions 41d in the circumferential direction, curves and protrudes into a semicircular shape. A positioning hole 41e is formed in each of the semicircular portions.

An inner circumferential surface of the outer ring 41b has two convex portions 41f each of which is shifted by 90° from the convex portion 41d. A cutout 41g is formed in each of the convex portions 41f. The rib 41c is not formed at the position where the convex portion 41f is formed. A receiving rib 41h for receiving the press ring 47 is formed on the upper surface of the outer ring 41b.

The second damper 42 includes a cylindrical portion 42a, a damper body 42b, and a ring 42c having a different diameter from each other in this order from above, such that the diameter of the cylindrical portion 42a is smallest and the diameter of the ring 42c is the largest. An attachment hole 42d is formed to penetrate vertically through the center portion of the second damper 42. An outer circumferential surface of the ring 42c has two cutouts 42e into which the bosses 53f of the attachment base 53 are inserted on a one-by-one basis. A rib 42f is formed on an outer circumference of the upper and lower surfaces of the ring 42c. The rib 42f comes in contact with the base body 53a of the attachment base 53, and an inner part of the ring 42c on which the rib 42f is not formed is not in contact with the base body 53a.

The press ring 47 presses the first damper 41 from above. Four cutouts 47a are formed in the press ring 47 at a pitch of 90°.

The damper housing cylinder 44 includes two positioning bosses 44a disposed at a pitch of 180° and two fixing bosses 44b disposed at a pitch of 180°. Each of the positioning bosses 44a has a relatively smaller diameter, and is used for positioning of the first damper 41 in the circumferential direction. Each of the fixing bosses 44b has a relatively larger diameter, and is used to fix the first damper 41. Each of the fixing bosses 44b is shifted by 90° from the corresponding positioning boss 44a. Each of the fixing bosses 44b has a screw hole 44c. A lower surface of each of the positioning bosses 44a has a screw hole 44d for fixing the attachment base 53 of the camera shoe attachment section 43.

Two convex portions 44e are formed on the outer circumferential surface of the damper housing cylinder 44 at a pitch of 180°. Each of the convex portions 44e has a cutout 44f around which the connection cord 9 is wound to be fit and fixed thereto when the connection cord 9 is not used. The front end of each of the positioning bosses 44a is inserted through the corresponding positioning hole 41e of the first damper 41 and the corresponding cutout 47a of the press ring 47. Further, each of the fixing bosses 44b is inserted through the cutout 41g on a one-by-one basis. In this state, a screw 62 is screwed to each of the screw holes 44c through the corresponding cutout 47a, and thus the second damper 42 and the press ring 47 are fixed to the damper housing cylinder 44. Note that the screw 62 may be directly screwed to each of the screw holes 44c without using the press ring 47.

The holder 46 consists of a holder body 46a having the shape of a bowl into which the protruding section 38 is inserted, and a small-diameter portion 46b protruding from the lower surface of the holder body 46a and having a diameter smaller than that of the holder body 46a. The upper surface of the holder body 46a includes a shoulder portion 46c for receiving the inner ring 41a of the first damper 41, and the lower surface of the holder body 46a includes a groove 46d into which the cylindrical portion 42a of the second damper 42 is inserted. The small-diameter portion 46b has a screw insertion hole 46e. An inner circumferential surface of the holder body 46a has a convex portion 46f which is inserted into the D-cut portion of the outer cylinder 38b so as to prevent the holder 46 from being rotated.

The inner cylinder 38a of the microphone unit 3 is inserted through the inner ring 41a, such that each of the convex portions 41d is inserted into the corresponding slit 38d of the outer cylinder 38b of the microphone unit 3.

The holder 46 is disposed in the damper housing cylinder 44, such that the inner ring 41a of the first damper 41 is located in the shoulder portion 46c. Further, the cylindrical portion 42a of the second damper 42 is inserted into the groove 46d and the small-diameter portion 46b is inserted into the attachment hole 42*d* of the second damper 42, such that the holder 46 is pivotally supported by the second damper 42. Further, the convex portion 46*f* is inserted into the D-cut portion of the outer cylinder 38*b* through which the first damper 41 is inserted, so as to prevent the holder 46 from being rotated. In this state, a screw 63 is screwed to the screw hole 38*c* formed in the inner cylinder 38*a* of the microphone unit 3 through the screw insertion hole 46*e*, so as to fix the holder 46 and the second damper 42. The projection 39 of the microphone unit 3 presses the upper surface of the inner ring 41*a*, and the first damper 41 is clamped between the projection 39 and the holder 46.

The ring 42*c* of the second damper 42 is fit into a convex portion 53*i* of the base body 53*a* of the attachment base 53. The positioning of the second damper 42 in the circumferential direction is performed by inserting the bosses 53*f* into the cutouts 42*e* on a one-by-one-basis, and the positioning of the second damper 42 in the radial direction is performed by the positioning rib 53*e* located outside the cylindrical portion 42*a*. In this state, a screw 64 is screwed to each of the screw holes 44*d* of the damper housing cylinder 44 through the corresponding screw insertion hole 53*g*, such that the attachment base 53 is fixed to the damper housing cylinder 44. The second damper 42 is clamped between the attachment base 53 and the holder 46.

Figure 5:
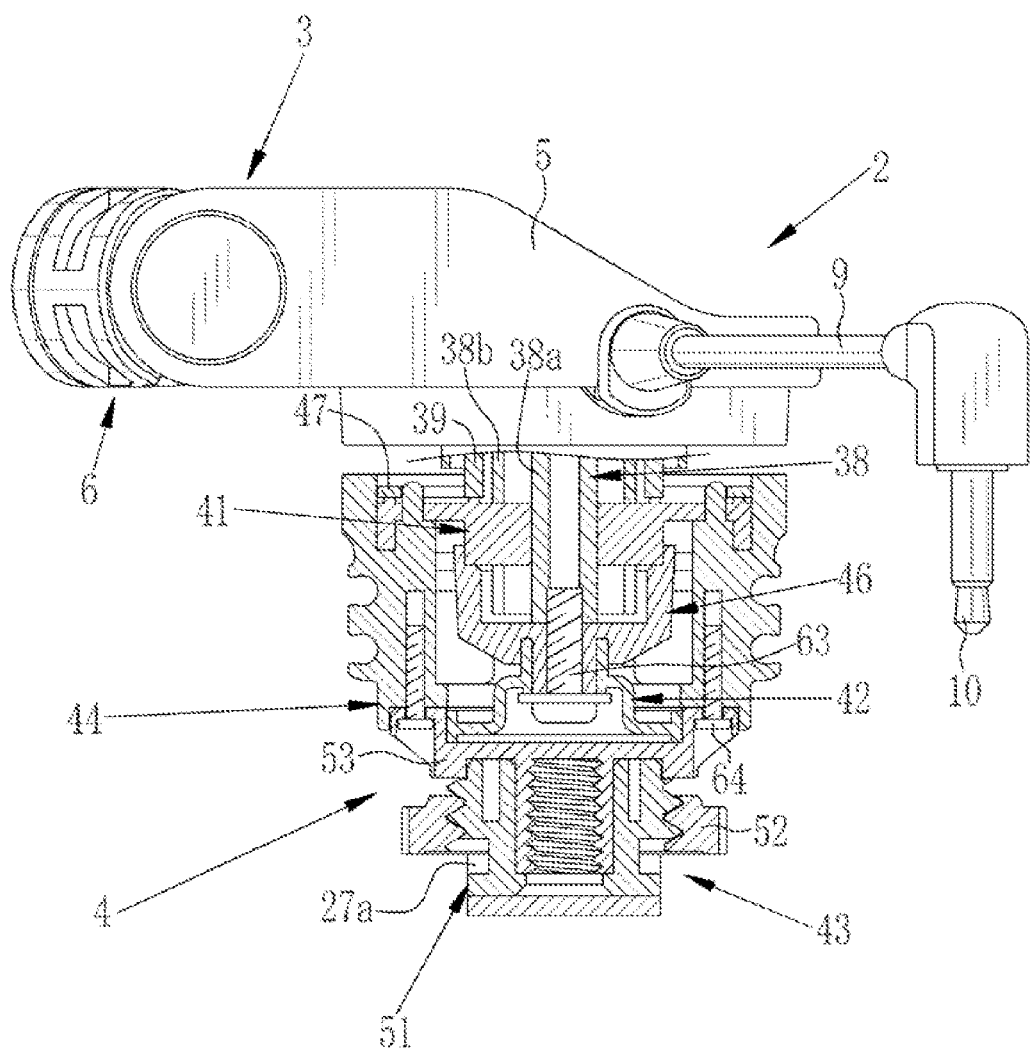
FIG. 5 is a cross-sectional view of the microphone assembly taken along lines A1-A1 of FIG. 3.

Next, the operation of the microphone assembly 2 is described. In order to capture a moving image with sound by using the digital camera 8, at first, the microphone assembly 2 is attached to the camera shoe 27. At this time, the plate portion 51*a* of the camera shoe attachment section 43 is inserted into the camera shoe 27, and then the clamp ring 52 is rotated to be moved downward, such that the bent sections 27*a* are clamped between the clamp ring 52 and the plate portion 51*a* as shown in FIG. 5.

After the microphone assembly 2 is attached to the camera shoe 27, the pin jack 10 of the connection cord 9 is connected to the connector 32 of the digital camera 8. While the microphone unit 3 is connected to the digital camera 8, the built-in microphone in the digital camera 8 remains in the off-state, and the recording is performed using the microphone unit 3. The microphone unit 3 is driven by an internal battery (not shown). Note that electricity may be supplied from the digital camera 8 to the microphone unit 3.

The mode setting dial 26 is operated to switch the mode of the digital camera 8 to the moving image/sound capturing mode, and then the release button 25 is pressed once to start capturing of a moving image. Upon starting of the moving image capturing, the imaging light having passed through the lens device 20 is incident on the image sensor in the camera body 8*a*. As is well known, a moving image is captured by the image sensor, and the image data is recorded on the memory card.

Concurrently with the moving image capturing, the sound in the scene enters the microphones 6 and 7, and is converted into a sound signal by the transducer 14 of each of the microphones 6 and 7. The sound signal is subjected to digital conversion by the control board 16, and then transmitted to the camera body 8*a* through the connection cord 9. The sound data is associated with the image data of the moving image, and recorded on the memory card or the recording medium of the external recording device.

While the moving image with sound is captured, the zooming operation, the focusing operation, and the shake correction are continuously performed. At this time, plural motors operate, and therefore the operating noise and the vibration thereof are generated. The vibration of the motors tends to be transmitted to the microphone assembly 2 through the camera body 8*a*. However, the first and second dampers 41 and 42 having elasticity pivotally support the microphone unit 3 at two points, and therefore the vibration of the motors is absorbed by the first and second dampers 41 and 42. For example, the vibration of the microphone unit 3 due to the vibration of the digital camera 8 in the horizontal direction is suppressed by the first and second dampers 41 and 42, and the vibration of the microphone unit 3 due to the vibration of the digital camera 8 in the vertical direction is suppressed mainly by the first damper 41.

Further, the operating noise of the motors is not collected by the microphones 6 and 7, because the microphones 6 and 7 are kept away from the camera body 8*a*. As a result, it is possible to perform recording with high-quality sound.

Furthermore, since the microphone unit 3 is provided with the protruding section 38 which is supported by the first and second dampers 41 and 42 so as to absorb the vibration transmitted to the microphone unit 3, it is possible to reduce the size of the microphone unit 3 in comparison with the case where a damper is disposed around the outer circumference of the microphone unit.

Additionally, since the second damper 42 pivotally supports the small-diameter portion 46*b* of the holder 46, it is possible to reduce the size of the microphone unit 3 in comparison with the case where an accordion rubber supports the outer circumference of the holder.

After the capturing of the moving image with sound is completed, or in the case where the digital camera 8 is intended to be kept somewhere, the clamp ring 52 is loosened to remove the leg portion 51 from the camera shoe 27, and thereby the microphone assembly 2 can be removed from the digital camera 8.

Note that, although the camera shoe attachment section of the microphone assembly is attached to a hot shoe as one of camera shoes in the above embodiment, the camera shoe attachment section may be attached to an accessory shoe in which no electrical connection is made.

Further, it is also possible to record only the sound without recording the moving image by using the microphone assembly. In this case, only the recorded sound data is stored in the memory card in the digital camera or the recording medium of the external recording device.

Various changes and modifications are possible in the present invention and may be understood to be within the present invention.

The invention claimed is:

1. A microphone assembly comprising:
   a microphone unit including at least one microphone, a casing to which said microphone is attached, a protruding section which protrudes downward from said casing, and a projection which projects downward from a circumference of said protruding section;
   a camera shoe attachment section detachably attached to a camera shoe formed on a body of a digital camera;
   a damper housing cylinder attached to said camera shoe attachment section;
   a holder having the shape of a bowl, attached to a lower portion of said protruding section;
   a first damper, into which said protruding section is inserted, attached to an inside of said damper housing cylinder, said first damper being clamped between said projection and said holder so as to support a middle portion of said protruding section; and
   a second damper for pivotally supporting a lower portion of said holder in said damper housing cylinder.

2. The microphone assembly as defined in claim 1, wherein said first damper comprises:

an inner ring into which said protruding section is inserted;
an outer ring disposed outside said inner ring;
a plurality of ribs configured to connect said inner ring and said outer ring; and
a positioning convex portion formed on an inner circumferential surface of said inner ring to prevent the protruding section from being rotated.

3. The microphone assembly as defined in claim 1, wherein said second damper comprises:
a cylindrical portion which is fitted into said holder;
a ring which is fitted into an inside of said camera shoe attachment section; and
a damper body having the shape of a dish and being configured to connect said cylindrical portion and said ring.

4. The microphone assembly as defined in claim 1, wherein said protruding section is a cylinder having a screw hole formed on a lower portion thereof, and a screw is threaded into said screw hole so as to fix said holder to the lower portion of said protruding section.

* * * * *